(12) United States Patent
Chakra et al.

(10) Patent No.: US 10,169,456 B2
(45) Date of Patent: Jan. 1, 2019

(54) AUTOMATIC DETERMINATION OF QUESTION IN TEXT AND DETERMINATION OF CANDIDATE RESPONSES USING DATA MINING

(75) Inventors: Al Chakra, Apex, NC (US); John A. Feller, Cary, NC (US); Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/585,181

(22) Filed: Aug. 14, 2012

(65) Prior Publication Data

US 2014/0052716 A1 Feb. 20, 2014

(51) Int. Cl.
*G06F 17/30* (2006.01)

(52) U.S. Cl.
CPC .... *G06F 17/30864* (2013.01); *G06F 17/3053* (2013.01)

(58) Field of Classification Search
CPC ......... G06F 17/30675; G06F 17/30011; G06F 17/30554; G06F 17/2785; G06F 17/3053
USPC ............................ 707/708, 723, 767; 706/21
See application file for complete search history.

(56) References Cited

U.S. PATENT DOCUMENTS

| | | | | |
|---|---|---|---|---|
| 6,766,287 B1 * | 7/2004 | Kupiec | ................. | G06F 17/274 704/9 |
| 6,904,564 B1 * | 6/2005 | Harris | ............... | G06F 17/30719 704/9 |
| 7,181,683 B2 * | 2/2007 | Chang | .................. | G06F 17/218 707/707 |
| 7,805,303 B2 * | 9/2010 | Sugihara et al. | ............. | 704/257 |
| 8,244,726 B1 * | 8/2012 | Matesso | ................ | G06Q 30/08 707/734 |
| 8,601,030 B2 * | 12/2013 | Bagchi | ............. | G06F 17/30654 706/52 |
| 8,832,584 B1 * | 9/2014 | Agarwal | ............... | G06F 3/0483 715/776 |
| 8,959,082 B2 * | 2/2015 | Davis | ................ | G06F 17/30047 707/723 |
| 2002/0138528 A1 * | 9/2002 | Gong | ..................... | G06F 17/27 715/254 |
| 2004/0254917 A1 | 12/2004 | Brill et al. | | |

(Continued)

OTHER PUBLICATIONS

H Ali, "Automation of Question Generation From Sentences," Proceedings of the Third Workshop on Question Generation, pp. 58-67, Jul. 26, 2010.*

(Continued)

*Primary Examiner* — Alexandria Bromell
(74) *Attorney, Agent, or Firm* — Joseph C. Polimeni; Edell, Shapiro & Finnan, LLC

(57) ABSTRACT

A method, a system and a computer program product provide responses to inquiries residing within text processed by an application. An inquiry is identified within text being processed by the application, and a context of the identified inquiry is determined. One or more available data sources is searched to produce a series of responses to the identified inquiry, and the series of responses is evaluated to rank and determine an accuracy level value for each response. The ranked responses along with associated accuracy levels can be displayed.

12 Claims, 6 Drawing Sheets

(56) References Cited

U.S. PATENT DOCUMENTS

| | | | |
|---|---|---|---|
| 2006/0059138 A1* | 3/2006 | Milic-Frayling | G06F 17/30867 707/707 |
| 2007/0226640 A1* | 9/2007 | Holbrook | G06F 17/30864 715/765 |
| 2008/0005651 A1* | 1/2008 | Grefenstette | G06F 17/3061 715/234 |
| 2008/0104065 A1* | 5/2008 | Agarwal | G06Q 10/10 707/707 |
| 2008/0133671 A1* | 6/2008 | Kalaboukis | 709/206 |
| 2009/0112828 A1* | 4/2009 | Rozenblatt | 707/4 |
| 2009/0119371 A1* | 5/2009 | Chang | H04L 12/1827 709/206 |
| 2009/0259642 A1 | 10/2009 | Cao et al. | |
| 2010/0235353 A1* | 9/2010 | Warnock | G06F 17/30696 707/723 |
| 2010/0268716 A1 | 10/2010 | Degaugue et al. | |
| 2010/0305942 A1* | 12/2010 | Chaney | G06F 17/3061 704/9 |
| 2011/0029895 A1* | 2/2011 | Ternouth | G06Q 10/10 715/753 |
| 2011/0106746 A1* | 5/2011 | Ventilla | G06Q 10/10 706/50 |
| 2011/0112849 A1* | 5/2011 | Beraja | G06F 19/324 705/2 |
| 2012/0041950 A1* | 2/2012 | Koll | G09B 7/02 707/728 |
| 2012/0072204 A1* | 3/2012 | Nasri | G06F 17/2229 704/9 |
| 2012/0078955 A1* | 3/2012 | Boguraev et al. | 707/769 |
| 2013/0007037 A1* | 1/2013 | Azzam | G06Q 10/107 707/769 |
| 2013/0013312 A1* | 1/2013 | Conkie | G10L 13/07 704/258 |
| 2013/0097181 A1* | 4/2013 | Sud | G06F 17/30864 707/748 |
| 2013/0157245 A1* | 6/2013 | Basu | G09B 7/02 434/362 |
| 2013/0166526 A1* | 6/2013 | Moxley | G06F 17/30861 707/706 |
| 2013/0282704 A1* | 10/2013 | Pantel | G06F 17/30867 707/723 |
| 2014/0317193 A1* | 10/2014 | Mitzlaff | G06F 17/30525 709/204 |

OTHER PUBLICATIONS

Matthiessen, C.-et al.; "Semantics for a Systemic Grammar: The Chooser and Inquiry Framework"; http://www.ip.com/pubview/IPCOM000128677D; Sep. 16, 2005.

Malkin, GS.-et al.; "FYI on Questions and Answers: Answers to commonly asked "experienced Internet user" questions"; http://www.ip.com/pubview/IPCOM000002021D; Sep. 12, 2000.

* cited by examiner

| RANKING PERCENTAGE | STATUS COLOR | EXAMPLE |
|---|---|---|
| 0-50% | RED | 25% |
| 51-75% | YELLOW | 63% |
| 76-100% | GREEN | 93% |

FIG.5

AUTOMATIC DETERMINATION OF QUESTION IN TEXT AND DETERMINATION OF CANDIDATE RESPONSES USING DATA MINING

BACKGROUND

1. Technical Field

Present invention embodiments relate to question/answer (QA) systems, where questions within text are identified and analyzed to determine appropriate answers.

2. Discussion of Related Art

Question/Answer (QA) systems are configured to provide possible answers to questions presented by a user, where the answers can include content (or links to content in a web based environment) associated with the answers. Typical QA systems are provided with a question and identify the content within the question (e.g., utilizing a natural language engine that parses portions of the question to develop a search query and then conduct a search to find candidate answers or candidate responses (search results) for the question.

While QA systems are known, such systems are configured such that a user presents a question to the system by inputting the question utilizing a suitable user interface (UI), such as a search engine or question prompt. Thus, a QA system typically receives an input question prompt from the user prior to engaging in a search to find candidate responses.

BRIEF SUMMARY

Embodiments of the present invention include a method, a system and a computer program product for providing responses to inquiries residing within text processed by an application. An inquiry is identified within text being processed by the application, and a context of the identified inquiry is determined. One or more available data sources is searched to produce a series of responses to the identified inquiry, and the series of responses is evaluated to rank and determine an accuracy level value for each response. The ranked responses along with associated accuracy levels can be displayed (e.g., within the application).

BRIEF DESCRIPTION OF THE SEVERAL VIEWS OF THE DRAWINGS

FIGS. 5 and 6 depict example visual displays for search results of the candidate responses determined by the search engine in the system of FIG. 1 according to an embodiment of the present invention.

DETAILED DESCRIPTION

Present invention embodiments pertain to Question/Answer (QA) type systems in which an inquiry or question is presented by a user entering text at a computing device in the course of engaging in an application (e.g., working in a word processing document, writing an email, engaging in an instant messaging communication or other types of communications with other users, etc.). A search engine monitors activities by the user in applications and identifies a question presented by the user. In response to identifying a question, the search engine conducts a search by data mining a plurality of data sources for candidate answers or candidate responses/search results associated with the question. The candidate responses/search results are provided in a suitable display format according to relevancy ranking. In particular, the search results can be color coded based upon ranking so as to provide an easy visual indication to the user regarding which search results may be most relevant.

The present invention embodiments enable an auto "question" checker feature that can be implemented to automatically identify questions input by a user in the text input for applications in a manner analogous to how an auto spell checker or auto grammar checker for a word processing document automatically checks for spelling/grammatical errors in the document. A search engine performs data mining of data sources (e.g., sources such as emails, calendar content, files, web sites and/or social networking sites on the internet, etc.). The auto "question" checker system can minimize the number of communications a user would need to perform to find an answer to a question (since the search engine can automatically perform searches for candidate responses to questions while the user is working on one or more applications in which a question was raised). The auto "question" checker feature further allows users to potentially obtain an answer to a question without having to leave a display screen or graphical user interface (GUI) in which the question was raised in order to seek out the answer, thus allowing a user to follow a stream of consciousness while writing text within an application (instead of having to stop to seek the answer).

Figure 1:
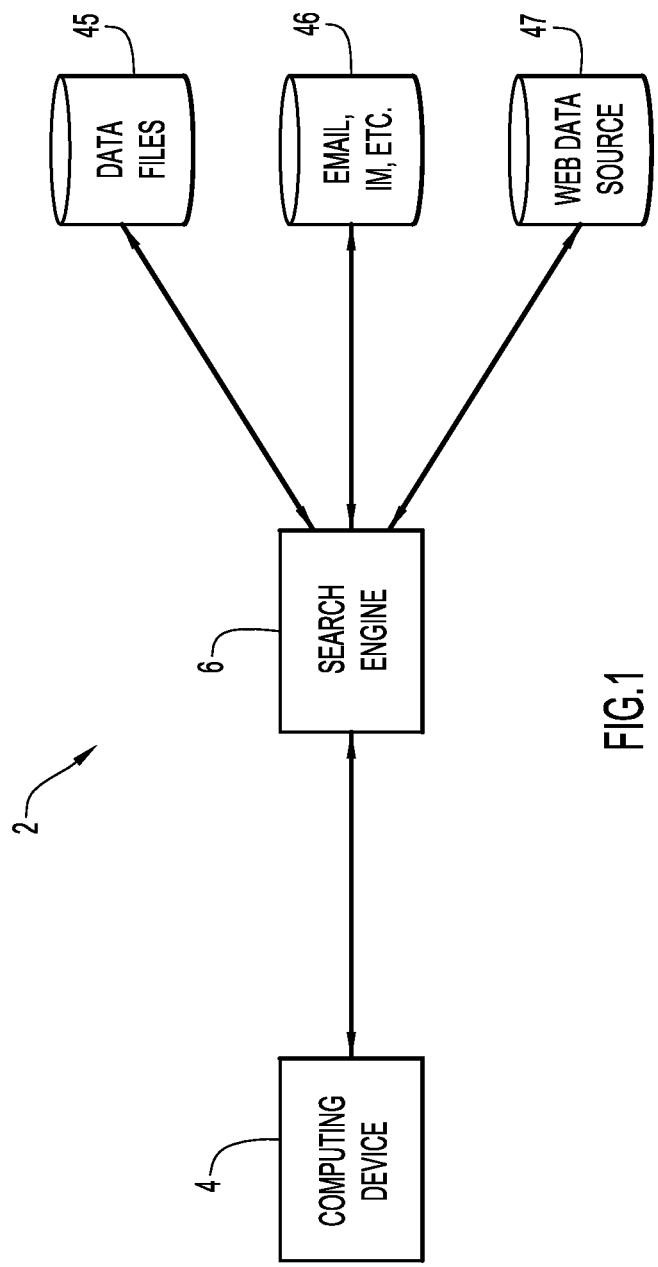
FIG. 1 is a diagrammatic illustration of a computing environment for an embodiment of the present invention.

An example computing environment that implements the features of automatic question detection and determination of search results is illustrated in FIG. 1. Specifically, the environment 2 includes a computing device 4 and a search engine 6. The computing device 4 and search engine 6 communicate with each other via any suitable communication medium. For example, the computing device and search engine can communicate with each other via a network (e.g., wide area network (WAN), local area network (LAN), Internet, Intranet, etc.). Alternatively, the computing device and search engine can be local to each other (e.g., connected via a hardwire, wireless link, etc.). While the interaction between a single computing device 4 and a single search engine 6 are described herein and depicted in FIG. 1, it is noted that any selected number of computing devices and search engines can be employed in the system, where two or more search engines can be utilized to monitor one or more computing systems to automatically find questions input as text within applications of such computing systems and generate search results for such questions.

The search engine 6 is connected via any suitable communication medium to a plurality of data sources that facilitate data mining by the search engine 6 to obtain candidate responses or search results for a question that is automatically identified when input as text at the computing device 4 by a user. Examples of different data sources as shown in FIG. 1 include, without limitation, data files 45 (e.g., a repository of documents, files, etc. that may or may not be accessible to the computing device 6), a communication data files 46 such as emails, instant messages, etc. and any one or more web data sources 47 (e.g., content at web sites, social networking sites, etc.).

Figure 2:
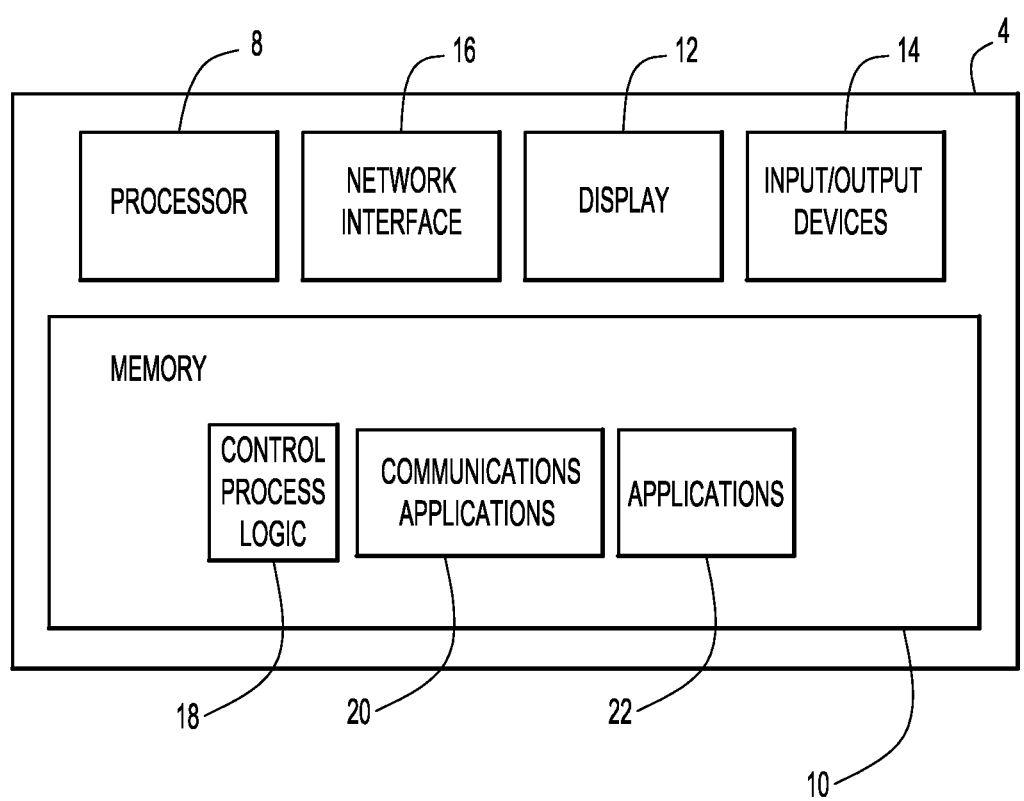
FIG. 2 is a schematic block diagram of a computing device used in the system of FIG. 1.

An example embodiment of a computing device 4 is depicted in FIG. 2. In particular, the computing device 4 includes a processor 8, a memory 10, a display 12 (e.g., an LCD display), input/output devices 14 (e.g., a keyboard, mouse, camera, microphone, speakers, etc.) and a network interface 16 (e.g., modem, network cards, etc.) that facilitate communications with other computing devices, search engines, servers, etc. over a network. The memory 10 can be RAM and/or ROM memory configured as one or more hardware units of the computing device. The memory 10 includes a control process logic software module 18 including operating system code for the processor 8 as well as any other suitable software to facilitate operations of the computing device 4 utilizing the processor 8. The memory 10 further includes a communications applications module 20 that includes one or more applications to facilitate communications of the user at the computing device 4 with other users at other computing devices. Examples of communications applications include, without limitation, one or more email applications for sending emails, one or more instant messaging applications for sending instant messages, and other types of communications applications that include audio, video and/or text content (e.g., web conferencing software, social networking software, etc.). The memory 10 also includes an applications module 22 that includes applications associated with documents being run by the computing device 4 and in which a user inputs text to create and/or modify such documents. Examples of documents that are run by applications within the applications module 22 include, without limitation, word processing documents, presentation documents (e.g., Microsoft PowerPoint documents), spreadsheet documents, etc.

Figure 3:
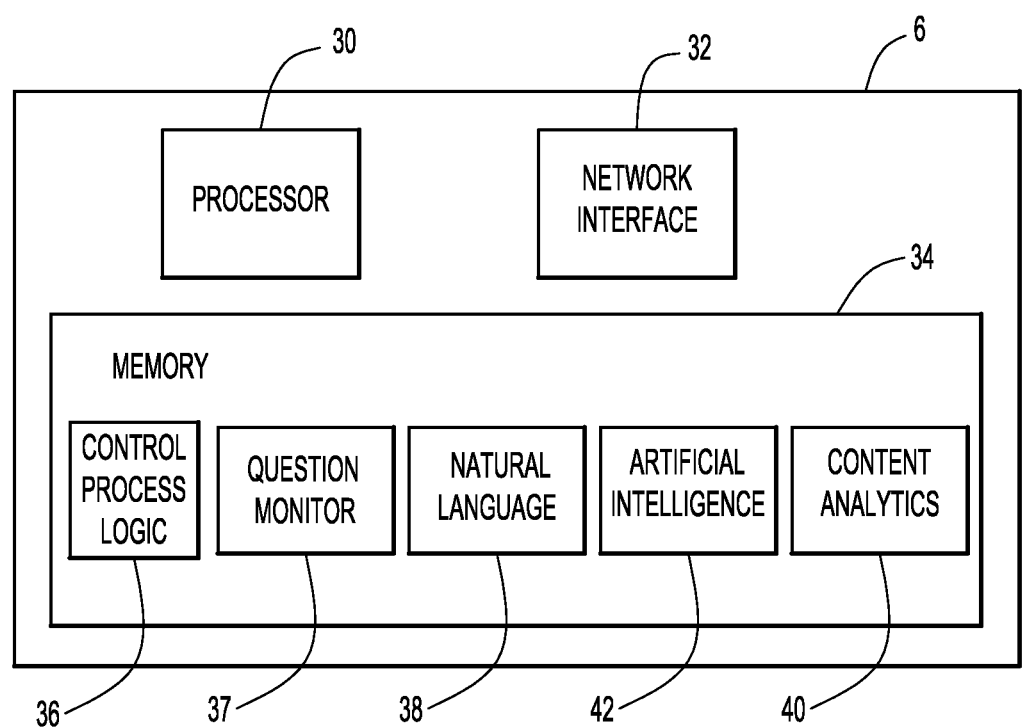
FIG. 3 is a schematic block diagram of a search engine used in the system of FIG. 1.

An example embodiment of a search engine 6 is depicted in FIG. 3. The search engine 6 includes a processor 30, a memory 34, and a network interface 16 (e.g., modem, network cards, etc.) that facilitate communications with other computing devices, search engines, servers, etc. over a network. The memory 34 can be RAM and/or ROM memory configured as one or more hardware units of the computing device. The search engine 6 can further include a display and/or other suitable input/output devices (e.g., a keyboard, mouse, camera, microphone, speakers, etc.) that may be needed for operation of the search engine.

The memory 34 of the search engine 6 includes a control process logic software module 36 including operating system code for the processor 30 as well as any other suitable software to facilitate operations of the search engine 6 utilizing the processor 30. The memory 34 further includes a question monitor module 37 including one or more applications that are configured to monitor text input by a user during operation of an application being run on computing device 4, a natural language module 38 including one or more suitable applications configured to interpret the content of an identified question by the question monitor module 37, a content analytics module 40 including one or more suitable applications configured to conduct a data mining operation of data sources (e.g., including data sources 45, 46 and 47 as depicted in FIG. 1) to generate candidate responses/search results based upon the identified question, and an artificial intelligence module 42 including one or more suitable applications configured to rank and generate one or more suitable displays for the search results.

The search engine 6 can optionally be incorporated as part of a server device that hosts certain operations of the computing device 4 (e.g., hosting communications applications and/or other applications to be used at the computing device 40. Further, the search engine 6 can be implemented with the various modules incorporated within a single device or separated into two or more devices in communication with each other. In still another embodiment, some portions or all of the search engine 6 can be incorporated as one or more components of the computing device 4 (e.g., the computing device 4 can include the search engine 6 as a number of modules including applications run by the processor 8 to achieve the operational features of automatically identifying questions and generating candidate responses as described herein).

Figure 4:
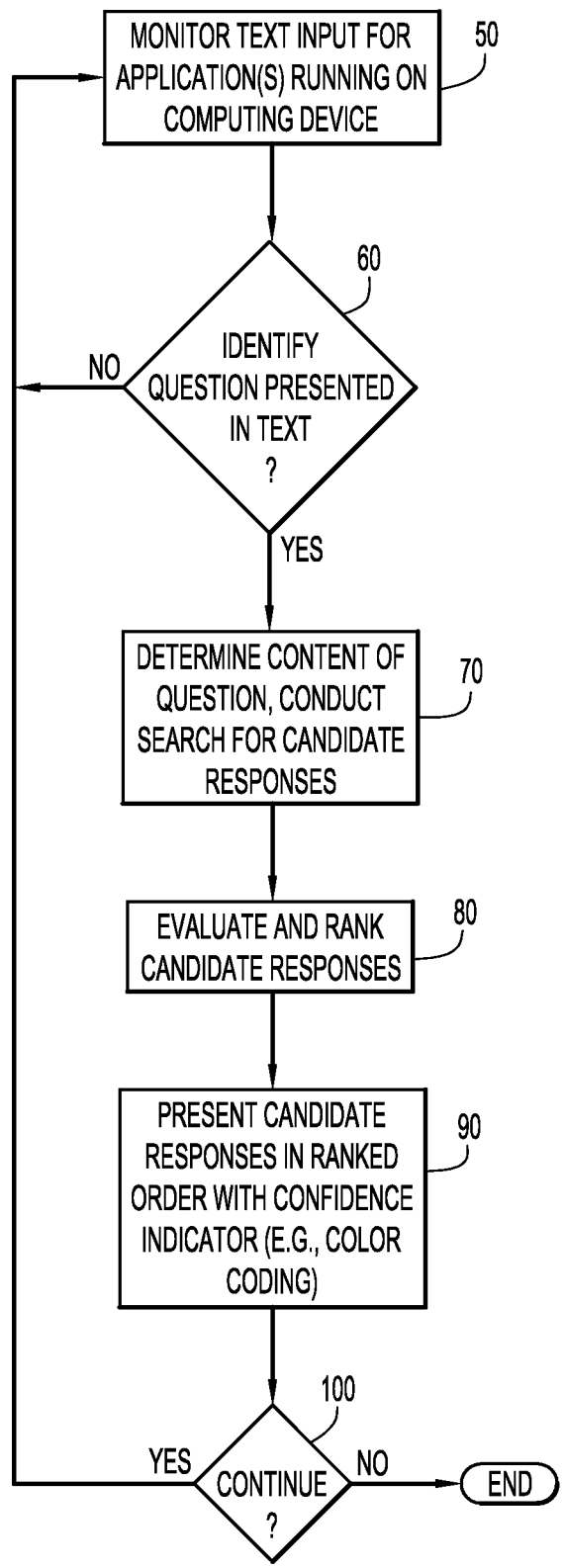
FIG. 4 is a procedural flow chart illustrating an example manner in which a question is identified within text of an application used by a computing device, and candidate responses for the question are generated according to an embodiment of the present invention.

Operation of the system is now described with reference to the flowchart of FIG. 4. Initially, it is noted that the auto question checker feature can be selectively implemented by a user of the computing system 4 (e.g., the user can selectively turn the auto question checker on or off). When implemented, the search engine 6 (utilizing question monitor module 37) automatically monitors text that is input in one or more applications by a user (e.g., the user entering text utilizing input keys from a keyboard, a touchscreen, etc.) at step 50. For example, a user can be writing an email to another user in which a question is presented (e.g., "How do I perform an operation X using program A?"). As another example, a user may present a question in an instant message to another user (e.g., "Can you send me the file that you prepared for January 2011 financial report results?"). As a further example, a user may present a question within a word processing document that will be sent to others (e.g., "How can I find more information about an operating system Z?"). The search engine 6 (utilizing question monitor module 37) can search for one or more predefined text comprising characters, words or phrases within input text that is used to identify a potential question. Some non-limiting examples of predefined text used to identify a potential question include a question mark ("?") identified at the end of a sentence, a word at the start of a sentence that may be indicative of a question (e.g., the sentence starts with "Who", "What", "When", "Why" or "Where"), etc. The search engine 6 can monitor multiple applications that may be open on the computing device 4 at any given time (e.g., communication applications as well as other applications from modules 20 and 22, such as applications that facilitate the generation of emails, instant messages, word processing or other documents, etc.).

When predefined text is identified within a larger body of text that has been input by a user for an application being run by the computing device 4, the search engine 6 identifies, at step 60, whether a question has in fact been identified. Using the natural language module 38, the text located adjacent and in proximity to the predefined text (e.g., a predetermined amount of text disposed immediately prior to a "?", a predefined amount of text subsequent to a word such as "Who", "What", "When", "Why" or "Where", etc.) is analyzed to determine whether a question exists.

If no question is identified, the search engine 6 continues monitoring input text for applications (step 50). In response to a question being identified, the search engine (using the natural language module 38 and the content analytics module 40) determines the content of the question and conducts a search for candidate responses or search results at step 70. In particular, the text located in proximity to predefined text can be parsed into words or phrases, and the definition of the words or phrases can be identified (e.g., using the natural language module 38) and combined to interpret the meaning of the question (e.g., using module 38 and/or module 40).

The search for candidate responses includes a data mining operation in which the search engine 6 (using content analytics module 40) searches any selected number of suitable data sources that may contain data (e.g., files, emails, instant messages, documents, web site content, content from social networking sites, etc.) of potential relevance to the identified question. For example, the search engine 6 can search any of the data sources 45, 46, 47 as depicted in FIG. 1. The search engine may also be selective in its search based upon the interpreted meaning or content of the identified question. For example, in a scenario in which the identified question presented is one in which a data file is being requested (e.g., the question "Can you send me the file that you prepared for January 2011 financial report results?" sent as an email from one user to another), the search engine can search one or more data sources that store data files associated with the type of data file requested in the question. In this scenario, the search engine can select to not search for content via the internet, since the search has been identified as limited to the location of a particular type of data file that would be located within a data repository associated with the users and would not likely be located at any internet web sites. The search engine 6 can further utilize any suitable one or more search algorithms (provided by content analytics module 40) to find potentially relevant content or potentially relevant documents or files associated with the identified question. Utilizing these techniques, the search engine 6 obtains a list of search results comprising candidate responses for the identified question.

After obtaining the list of search results, at step 80, the search engine 6 (utilizing the artificial intelligence module 42) evaluates the candidate responses from the search results in order to rank the results based upon a likelihood of confidence or accuracy in relation to the relevance of each candidate response from the search results. In particular, the artificial intelligence module 42 can utilize any conventional or other techniques for analyzing the content of the identified question and how well candidate responses match the question. One or more accuracy level scoring algorithms can be applied to rank results, where any number of techniques, such as natural language processing, semantic analysis, information retrieval, automated reasoning, and machine learning, can be used to analyze the identified question and determine which candidate responses from the search results are the most relevant. The artificial intelligence module 42 can also use various internal and external information sources (e.g., web pages, data caches, databases and/or other storage structures containing indexes, metadata, language rules, dictionaries, thesauri, encyclopaedias, articles, literary works, etc.) to better understand the identified question and form and verify hypotheses for suitable answers. By way of example, the artificial intelligence module 42 may include or communicate with a conventional system (e.g., IBM WATSON system, etc.) employing these types of techniques to ascertain the most relevant candidate responses from the search results so as to rank the candidate responses with an appropriate confidence or accuracy level factor.

After evaluation and ranking of candidate responses from the search results, the search engine 6 (at step 90) can generate a display of the candidate responses in a ranking order with one or more accuracy level indicators associated with the candidate responses. In an example embodiment, a color coded accuracy level indicator can be generated for display by the display 12 of the computing device 4.

The search results can be provided by the search engine as a display that appears within the application in which the question was presented or, alternatively, as another display that overlays the application currently being used by the user at the computing device 4 (e.g., as a pop-up window displaying the search results while the user is working in the application). Alternatively, the search engine can send a message to the user's computing device 4 (e.g., as an email, as a smaller pop-up window within a corner of the display 12 of the computing device 4, as an indicator or icon provided within the application and in proximity to the question, or in some other non-intrusive manner) indicating that candidate responses are available for review in association with the question presented by the user. The processing time for obtaining candidate responses can be sufficiently fast such that candidate responses are generated within a relatively short time period after the user has input the question in an application (e.g., within seconds).

Figure 6:
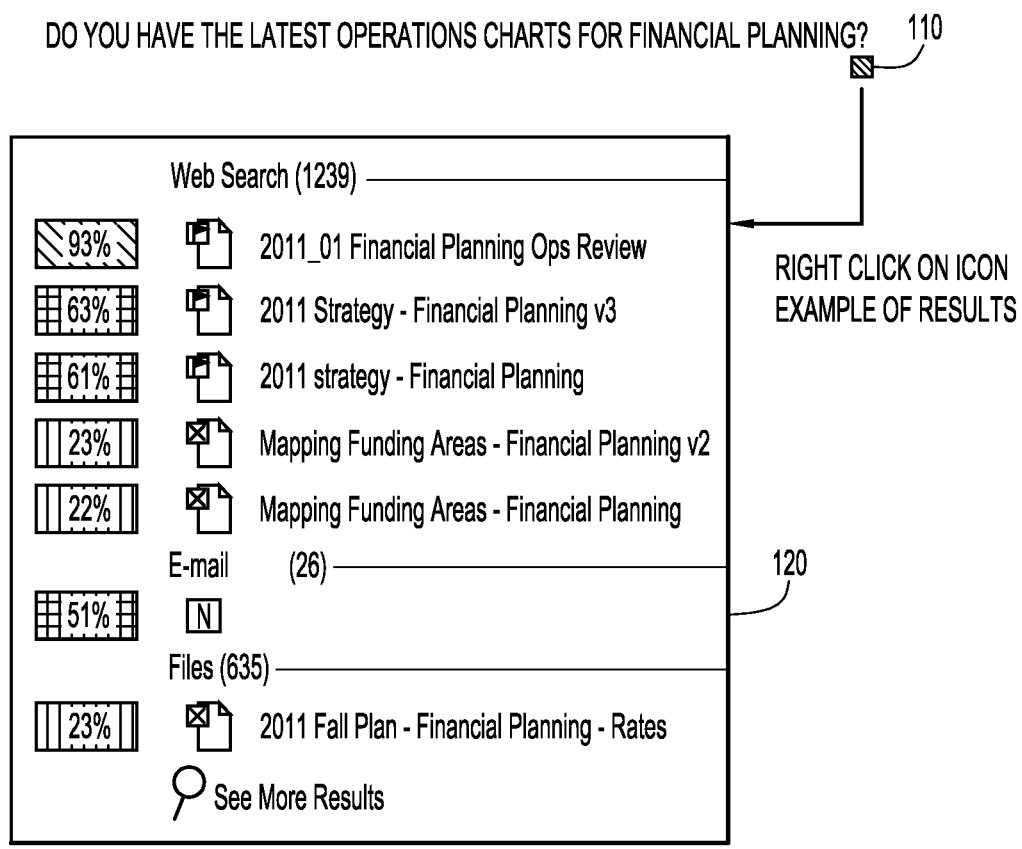

Example embodiments showing a display of search results that can be generated by the system 2, in which confidence or accuracy level indicators are provided by color coding the candidate responses, is depicted in each of FIGS. 5 and 6. The example embodiments are based upon the following identified question: "Do you have the latest Operations Charts for Financial Planning?" (e.g., a question that is presented by a user within an email or instant message). Display of the candidate responses can be depicted in a chart as shown in FIG. 5, where candidate responses from the search results are grouped together based upon accuracy level factor (provided as a percentage), and with color coding assigned to the accuracy level factor ranges. In particular, as depicted in the chart of FIG. 5, candidate responses having an accuracy level factor in the range of 0-50% are color coded red, while more relevant candidate responses having an accuracy level factor in the range of 51-75% are color coded yellow, and most relevant candidate responses having an accuracy level factor in the range of 76-100% are color coded green. The display chart of FIG. 5 can further be configured to be navigable to other displays by the user making a selection (e.g., by clicking with a mouse) at one or more locations or icons within the display chart. For example, a user can click on an accuracy level factor range to display a listing of candidate responses within that range that have been generated from the search. The search results can further allow a user to navigate to a particular candidate response/search result by clicking upon a particular search result within the listing.

In another embodiment, the search engine 6 can provide an image or icon 110 near the question presented as text within the application running on the computing device 4, where the icon 110 indicates that search results comprising candidate responses are available for viewing by the user. For example, if the question is presented within a document or an email, an icon 110 can appear at the end of the question within the document or email, where the icon indicates that candidate responses are available for viewing. The icon 110 can further be color coded (e.g., green) to indicate what the highest accuracy level factor is for the candidate responses obtained within the search results. This provides the user with immediate information regarding whether the search results obtained may be useful in providing a possible answer to the question before the user even begins to look at the search results.

By clicking upon the icon 110 (e.g., a right click using a mouse), a listing 120 of search results can be displayed. The listing 120 of search results ranks candidate responses based upon color coding (with highest accuracy level factor ranking percentage first) and is further categorized based upon the data sources from which the candidate responses were obtained (e.g., from a web search, from emails, from data files, etc., where the number of candidate responses from each data source is further provided in parentheses adjacent the data source listing). As depicted in FIG. 6, the most relevant (green color coded, ranking of 93%) candidate response associated with the identified question is a presentation document (e.g., a Microsoft PowerPoint presentation document) with the title "2011_01 Financial Planning Ops Review". The display depicted in FIG. 6 can further be navigable so as to allow the user to navigate to the candidate response in a manner similar to a typical search such as a web based search. For example, by clicking upon the most relevant candidate response depicted in FIG. 6, the user may navigate to a website link that provides a copy of the document (or content associated with the document).

Other types of displays can also be implemented, in which color coding and/or any other suitable types of accuracy level indicators can be utilized to easily identify the most relevant candidate responses as determined by the artificial intelligence module 42. For example, a display could be generated based upon a user selecting a particular color coding from the chart in FIG. 5 (e.g., selecting green), which would result in only candidate responses assigned this color coding being displayed in another display.

Thus, the example embodiments of the present invention provide an automatic question checker feature in which a search engine automatically monitors user input of text associated with applications being run on a computing device. When a question is identified from the input text, the search engine generates search results comprising candidate responses and ranks the candidate responses with accuracy level factors. This automatic answering feature for questions being presented by a user allows the user to obtain potential candidate responses to the questions, with the answers being displayed in a ranked order, without having to manually search for such answers (thus stopping the thought process the user is currently engaged in during input of text for an application).

It will be appreciated that the embodiments described above and illustrated in the drawings represent only a few of the many ways of implementing embodiments for automatically determining a question within text and using data mining to determine candidate responses.

The modules of the search engine may use any manner of analysis to analyze a question or inquiry (e.g., language rule sets, language processing, semantic analysis, information retrieval, automated reasoning, machine learning, etc.) and further to determine an answer to a query (e.g. frequency analysis, reliability and fuzzy matching, language processing, semantic analysis, information retrieval, automated reasoning, machine learning, etc.). Further, the modules may use any combination of information resources (e.g., search results, web pages, data caches, databases, etc.) containing any structured or unstructured data (e.g., indexes, metadata, language rules, dictionaries, thesauri, encyclopedias, articles, literary works, etc.).

The topology or environment of the present invention embodiments may include any number of computer or other processing systems (e.g., client or end-user systems, server systems, etc.) and search engines, databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any suitable operating system and any suitable software (e.g., browser software, communications software, server software, natural language processing software, search engine and web crawling software, etc.). These systems may include any types of monitors and input devices (e.g., keyboard, mouse, voice recognition, touch screen, etc.) to enter and/or view information.

It is to be understood that the software (e.g., the modules associated with the search engine or any other components of the systems) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other search engines, databases, data stores or storage structures (e.g., files, databases, data structures, data or other repositories, etc.) to store information (e.g., web pages, caches, indexes, metadata, language rules, dictionaries, thesauri, encyclopedias, articles, literary works, etc.). A database system utilized in the automatic question identifier and candidate response generator systems may be implemented by any number of any conventional or other databases, data stores or storage structures (e.g., files, databases, data structures, data or other repositories, etc.) to store information (e.g., web pages, caches, indexes, metadata, language rules, dictionaries, thesauri, encyclopedias, articles, literary works, etc.). The search engine may be included within or coupled to the server and/or client systems. The search engine data storage structure may be remote from or local to the computer or other processing systems, and may store any desired data (e.g., rules, data to be analyzed, etc.).

Present invention embodiments may be utilized for analyzing any types of data (e.g., alpha numeric text, symbols, markup language, previews, images, waveforms, binary data, etc.) representing any information. Further, present invention embodiments may be utilized for generating answers utilizing content obtained from any types of sources (e.g., web sites, files, directories, databases, memory devices, data structures, processing devices, various types of stationary or mobile computer or processing systems or devices, etc.).

The present invention embodiments may employ any number of any type of user interface (e.g., Graphical User Interface (GUI), command-line, prompt, etc.) for obtaining or providing information (e.g., for inputting text by a user including questions, for displaying candidate responses, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of providing responses to inquiries residing within input text processed by an application comprising:
    enabling, via a processor, a feature to provide the responses to the inquiries residing within the input text processed by the application;
    monitoring, via the processor, the input text during entry into a user interface of the application by a user and automatically identifying an inquiry within the input text during the entry into the user interface, wherein the application provides the input text within one or more from a group of a word processing document, a presentation document, a spreadsheet document, an email and an instant message, wherein identifying an inquiry within the input text during the entry into the user interface further includes:
    parsing the input text to identify predefined text including one or more from a group of a question mark and an initial word of a sentence indicative of a question; and
    analyzing a predefined amount of text in proximity of the identified predefined text to identify a string of text corresponding to a question;
    in response to the identifying of the inquiry during entry of the input text and while the user remains within the user interface of the application:
    determining, via the processor, a context of the identified inquiry, wherein determining a context of the identified inquiry includes:
    parsing text of the identified inquiry into one or more words and combining definitions of the one or more words to determine a meaning of the identified inquiry using natural language processing;
    identifying one or more data sources from among a plurality of data sources associated with the determined meaning of the identified inquiry;
    controlling, via the processor, a search engine to perform a search limited to the identified one or more data sources associated with the determined meaning of the identified inquiry to produce a series of responses to the identified inquiry, wherein the searching is automatically initiated from the user interface of the application based on the inquiry identified during entry of the input text;
    evaluating the series of responses, via the processor, to rank each of the responses and determine an associated accuracy level value for each response; and
    displaying the ranked responses within the user interface of the application during entry of the input text into the user interface, wherein displaying the ranked responses further includes:
    displaying each of the ranked responses and the associated accuracy level value for each response, wherein the associated accuracy level value comprises a color coding corresponding to a relevance of the ranked response.

2. The method of claim 1, wherein displaying the ranked responses further includes:
    Placing an indicator near the identified inquiry within the user interface of the application to indicate that the ranked responses are available for display; and
    In response to a user selecting the indicator, displaying the ranked responses and associated accuracy level values within the user interface of the application for selection.

3. The method of claim 2, wherein the indicator provides an identification of accuracy level values associated with highest ranked responses.

4. The method of claim 1, wherein monitoring the input text further includes:
    monitoring a plurality of applications each open on the computer at a same time to automatically identify an inquiry within input text entered into any of the plurality of open applications.

5. The method of claim 1, wherein evaluating the series of responses to rank each of the responses further includes:
    analyzing inquiries and learning, via the processor, relevancy of responses to the analyzed inquiries; and
    analyze analyzing the identified inquiry and determining relevance of responses of the series of responses based on the learning by the processor in order to rank the responses with the associated accuracy level.

6. The method of claim 1, wherein displaying the ranked responses further includes:
    generating, via the processor, a window displaying the ranked responses and overlaying the window on the user interface of the application to enable viewing of the ranked responses during entry of the input text into the user interface.

7. A system for providing responses to inquiries residing within input text processed by an application comprising:
a processor configured to:
enable a feature to provide the responses to the inquiries residing within the input text processed by the application;
monitor the input text during entry into a user interface of the application by a user and automatically identify an inquiry within the input text during the entry into the user interface, wherein the application provides the input text within one or more from a group of a word processing document, a presentation document, a spreadsheet document, an email and an instant message, wherein identifying an inquiry within the input text during the entry into the user interface further includes:
parsing the input text to identify predefined text including one or more from a group of a question mark and an initial word of a sentence indicative of a question; and
analyzing a predefined amount of text in proximity of the identified predefined text to identify a string of text corresponding to a question;
in response to the identifying of the inquiry during entry of the input text and while the user remains within the user interface of the application:
determine a context of the identified inquiry, wherein determining a context of the identified inquiry includes:
parsing text of the identified inquiry into one or more words and combining definitions of the one or more words to determine a meaning of the identified inquiry using natural language processing;
identify one or more data sources from among a plurality of data sources associated with the determined meaning of the identified inquiry;
control a search engine to perform a search limited to the identified one or more data sources associated with the determined meaning of the identified inquiry to produce a series of responses to the identified inquiry, wherein the search is automatically initiated from the user interface of the application based on the inquiry identified during entry of the input text;
evaluate the series of responses to rank each of the responses and determine an associated accuracy level value for each response; and
display the ranked responses within the user interface of the application during entry of the input text into the user interface, wherein displaying the ranked responses further includes:
displaying each of the ranked responses and the associated accuracy level value for each response, wherein the associated accuracy level value comprises a color coding corresponding to a relevance of the ranked response.

8. The system of claim 7, wherein the search engine comprises the processor and communicates with a computing device that runs the application.

9. The system of claim 7, wherein displaying the ranked responses further includes:

placing an indicator near the identified inquiry within the user interface of the application to indicate that the ranked responses are available for display; and
in response to a user selecting the indicator, displaying the ranked responses and associated accuracy level values within the user interface of the application for selection.

10. A computer program product for providing responses to inquiries residing within input text processed by an application, the computer program product comprising:
a non transitory computer readable storage medium having computer readable program code embodied therewith, the computer readable program code configured to:
enable a feature to provide the responses to the inquiries residing within the input text processed by the application;
monitor the input text during entry into a user interface of the application by a user and automatically identify an inquiry within the input text during the entry into the user interface, wherein the application provides the input text within one or more from a group of a word processing document, a presentation document, a spreadsheet document, an email and an instant message, wherein identifying an inquiry within the input text during the entry into the user interface further includes:
parsing the input text to identify predefined text including one or more from a group of a question mark and an initial word of a sentence indicative of a question; and
analyzing a predefined amount of text in proximity of the identified predefined text to identify a string of text corresponding to a question;
in response to the identifying of the inquiry during entry of the input text and while the user remains within the user interface of the application:
determine a context of the identified inquiry, wherein determining a context of the identified inquiry includes:
parsing text of the identified inquiry into one or more words and combining definitions of the one or more words to determine a meaning of the identified inquiry using natural language processing;
identify one or more data sources from among a plurality of data sources associated with the determined meaning of the identified inquiry;
control a search engine to perform a search limited to the identified one or more data sources associated with the determined meaning of the identified inquiry to produce a series of responses to the identified inquiry, wherein the search is automatically initiated from the user interface of the application based on the inquiry identified during entry of the input text;
evaluate the series of responses to rank each of the responses and determine an associated accuracy level value for each response; and
display the ranked responses within the user interface of the application during entry of the input text into the user interface, wherein displaying the ranked responses further includes:
displaying each of the ranked responses and the associated accuracy level value for each response, wherein the associated accuracy level value comprises a color coding corresponding to a relevance of the ranked response.

11. The computer program product of claim 10, wherein displaying the ranked responses further includes:
   placing an indicator near the identified inquiry within the user interface of the application to indicate that the ranked responses are available for display; and
   in response to a user selecting the indicator, displaying the ranked responses and associated accuracy level values within the user interface of the application for selection.

12. The computer program product of claim 11, wherein the indicator provides an identification of accuracy level values associated with highest ranked responses.

* * * * *